Nov. 21, 1933.                L. FRANK                1,936,109
VALVE HANDLE
Filed July 21, 1932
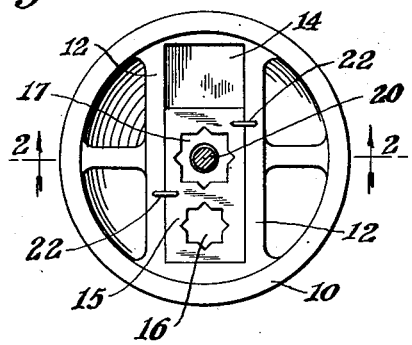
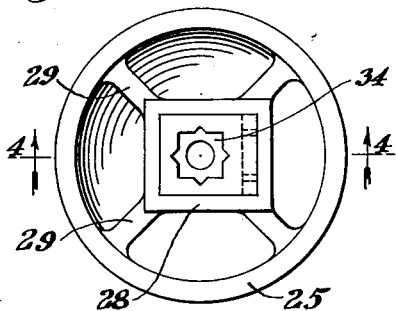
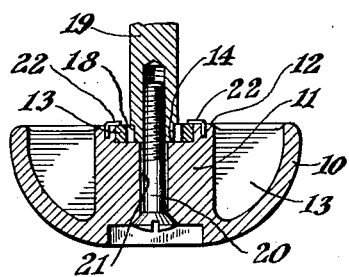
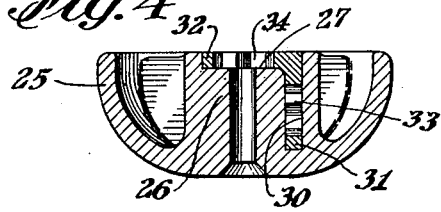
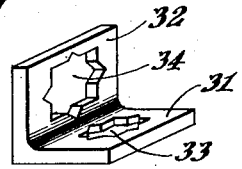
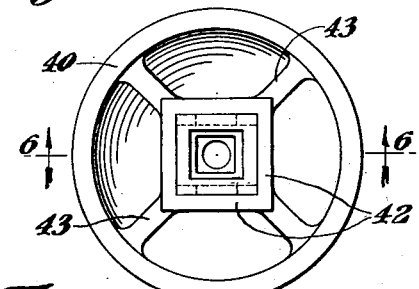
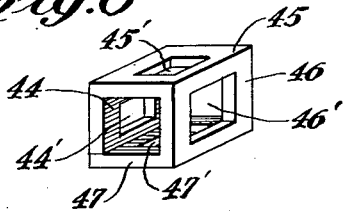
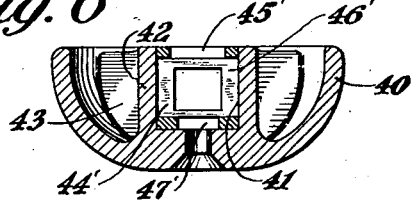
INVENTOR.
Louis Frank
BY Warren E. Willis.
ATTORNEY Patented Nov. 21, 1933

1,936,109

UNITED STATES PATENT OFFICE 1,936,109

VALVE HANDLE

Louis Frank, New York, N. Y.

Application July 21, 1932. Serial No. 623,713

4 Claims. (Cl. 287—53)

This invention relates to handles as applied axially to the ends of rotative rods, spindles and stems, whereby they may be manually operated, and more particularly to the stems of radiator valves.

Such valve stems are ordinarily cylindrical to turn freely in the stuffing boxes supplied with packing material, their outer ends being squared for a short distance and provided with an internally screw-threaded opening to receive a clamp screw by which the handle is held securely on the squared portion of the stem to which they are snugly fitted.

However, it is found in practice that the valve stems differ considerably in diameter, and so too does the squared portions or shanks on which the handles should tightly fit.

As such handles are moulded or pressed from a material of a nature non-conductive of heat, such as hard rubber, indurated fiber, synthetic rosins, etc., similar in size for convenience in grasping, it is highly desirable that a simple, cheap and effective adapting means be employed whereby the handles will fit all ordinary sizes of stems without change in their structure.

Having this matter in mind, it is an object of the invention to provide commercial valve handles with an axial metallic adapter, having in its several faces differently sized socket apertures corresponding to the dimensions of the valve stems to which they may be applied.

A further feature is in the provision of means whereby the adapter socket may be moved to present any selected socket centrally of the handle, while the body of the adapter is deeply sunk in the handle to be held frictionally tight.

Another purpose is to provide a knob-like handle, symmetrical and pleasing in appearance, capable of long continued use, simple and inexpensive to construct.

These several advantageous objects are accomplished by the novel construction, arrangement and combination of parts hereinafter described and illustrated in the accompanying drawing, constituting a material component of this disclosure, and in which:—

Figure 1 is a bottom plan view of an embodiment of the invention in its simplest form.

Figure 2 is a transverse sectional view taken on line 2—2 of Fig. 1, and shown as engaged on a valve stem.

Figure 3 is a bottom plan view of a modified form of the handle.

Figure 4 is a sectional view taken on line 4—4 of Fig. 3.

Figure 5 is another bottom plan view showing the preferred form of the handle.

Figure 6 is a transverse sectional view taken on the line 6—6 of Fig. 5.

Figure 7 is a perspective view of the right angled insert as shown in Figs. 2 and 3.

Figure 8 is a similar view of the rectangular adapter as shown in Figs. 5 and 6.

The body 10 of the valve stem handle may be of any preferred shape that is convenient for grasping in the hand; its outer edge usually being corrugated in order to obtain an effective grip.

In Figs. 1 and 2 the under side of the body, shown as cup shaped, is formed to present a symmetrical transverse ridge 11 having guide flanges 12 along its parallel lateral edges, which may be reinforced by ribs 13.

The outer surface of the ridge 11 is level to act as a seat 14 for an adapter bar 15, slidably guided therein by the ribs, the endwise movement of the bar being limited by the raised portions connecting the flanges 12.

The bar 15 is provided with two apertures 16 and 17 each being formed to two different sizes of sockets to fit squared portion 18 of the valve stems 19, which are held firmly in position within the body by a clamp screw 20 passing through an axial opening 21 in the handle, the head of the screw being accessible from the outer side of the handle body, thereby retaining the stem axially, while the selected socket aperture prevents relative rotary movement.

If desired, the bar 15 may be held on the seat 14 by pins 22 set in the flanges 12 and bent over to retain the bar in place.

As shown in Figs. 3 and 4 the handle body 25 is also cup shaped at its under side and formed to present a mound 26 affording a seat 27 and guide flanges 28 connected by radial ribs 29 to the wall of the cup body.

Extending inward from the seat 27, at one of its edges, is a deep transverse groove 30 suited to receive one of the right angled limbs 31 of a bent adapter bar, the other limb 32, at that time resting on the seat 27.

Each limb of the right angled adapter bar is provided with socket apertures 33 and 34 and each socket is shaped to engage two different sizes of valve stems in the manner previously described.

Obviously to withdraw the adapter, shown in detail in Fig. 7, to change from one size of stem to another is an easy matter, while the clamping screw holds the parts in their adjusted positions.

Another form, shown in Figs. 5, 6 and 8 may be preferred, the same consisting of a handle body 40 having a raised central chamber 41 surrounded by four walls 42, connected by ribs 43 with the interior of the body.

Disposable in the chamber is a square hollow block having walls 44—45—46—47 each containing a single rectangular socket 44'—45'—46'—47', which vary only in the size of openings and which may be placed to present any selected wall outermost, the ends of the block being open.

The clamp screw passes through the inner opening to engage the valve stem, the square portion of which fits the socket, and it is to be noted that this form is truly symmetrical and the lightest in weight.

While certain preferred embodiments of this device have been shown and described, it will be understood that changes in the form, arrangements, proportions, sizes and details thereof may be made without departing from the scope of the invention as defined in the appended claims.

Having thus described the invention, what is claimed as new and desired to secure by Letters Patent, is:—

1. A radiator valve stem handle comprising a body having a central rectangular cavity in its under surface, and a bar movable therein, said bar having selective apertures of different sizes to receive corresponding sized stems, the walls of the cavity guiding said bar whereby the selected aperture is disposed axially of the body.

2. A radiator valve stem handle comprising a body having an oblong shallow rectangular cavity in its under side, and a bar having two spaced apertures, each aperture having means to engage two sizes of valve stems therein, said bar being adjustable in the cavity whereby the selected aperture may be moved into an axial position relative to said body.

3. A radiator valve stem handle comprising a body having a central rectangular cavity in its under surface, a bar movable therein, said bar having selective apertures of different sizes to receive corresponding sized stems, the walls of the cavity guiding said bar whereby the selected aperture is disposed axially of the body, and means fixed in said walls to retain said bar slidably in the cavity.

4. A radiator valve handle comprising a substantially circular body having a shallow rectangular recess extending transversely across the under side of said body from one edge to the other, a flat metallic adapter bar slidable in said recess, said bar having apertures to receive valve stems of unlike cross section selectively, and means to retain a valve stem when assembled.

LOUIS FRANK.